Sept. 8, 1931.  E. E. ESSEN  1,822,587

SPRING TESTING DEVICE

Filed March 9, 1927

Inventor
Eric E. Essen
Owen W. Kennedy
By Attorney

Patented Sept. 8, 1931

1,822,587

UNITED STATES PATENT OFFICE

ERIC E. ESSEN, OF BROOKLYN, NEW YORK

SPRING TESTING DEVICE

Application filed March 9, 1927. Serial No. 174,082.

This invention relates to spring testers and measuring devices with particular reference to that class of devices for manually compressing and simultaneously measuring automatically valve springs and other coil springs in order to determine their resistance to compression which is a direct index of their strength.

One object of my invention is to provide means of the character indicated for measuring the actual strength or compressive resistance of valve springs or other coiled springs which are commonly used on internal combustion motors and similar structures.

Another object is to make a measuring device of this class which is furnished with seats upon both extremities for receiving on one hand the active upper member of a valve lifter, and on the other engaging the head of a valve, respectively, and remaining in seated position during the operation of the valve lifter. It is also an object of my invention to so combine the measuring instrument and the spring compression device that they may be for all intents and purposes considered as constituting a single tool while used in said association, and it will be clearly apparent from the following description that such association may be permanent in a combined structure, if found desirable.

Further objects and the advantages resulting from the use of my device will appear more fully as this specification proceeds.

In the accompanying drawings.

Throughout the views, the same reference numerals indicate the same parts.

Figure 1:
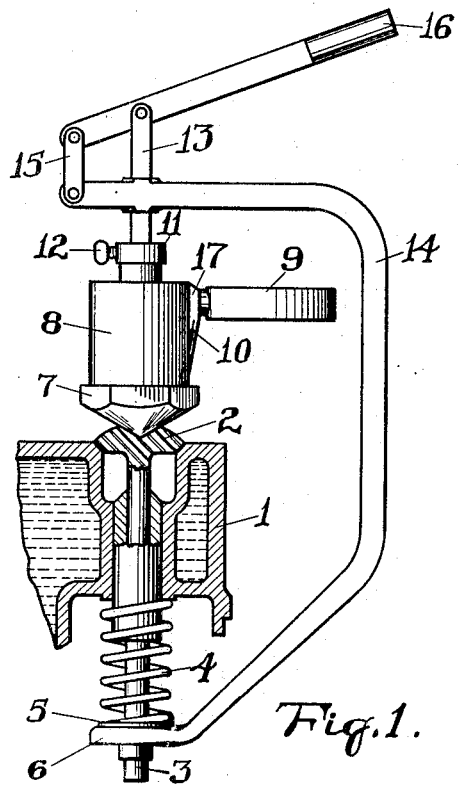
Fig. 1 is a view of a fragment of a motor block of an engine with a measuring device made according to my invention while in position for use and associated with a valve spring compressor in initial operative position.
Figure 2:
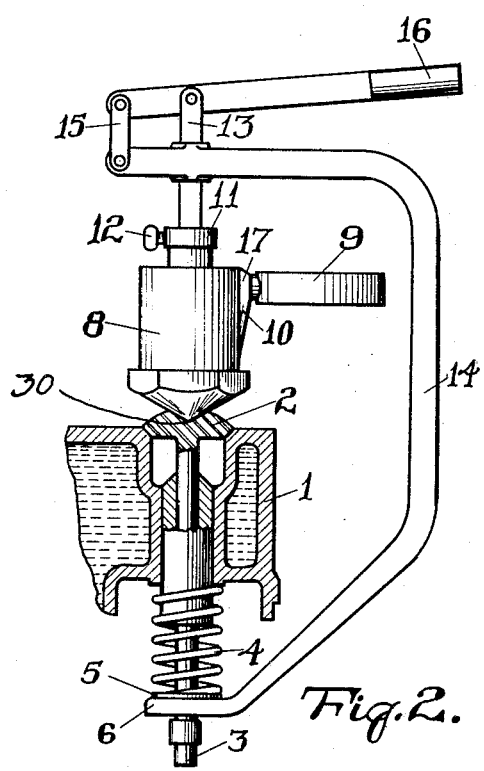
Fig. 2 is a similar view with the parts in advanced position and the spring of the valve under pressure at the proper position when its condition may be read upon the device.

When repairing and adjusting internal combustion motors and other valve controlled apparatus, it is often desirable to determine the condition of the springs which are normally mounted upon the valves, to see whether they have lost their power or strength, through overheating or other causes, and that is one reason that the present invention has been conceived.

In the practice of my invention, an oil housing or cylinder 8 is provided internally with a piston 21 which has an upward projection at 11, there being a constriction or stop 23 upon the housing to limit the possible movement of the piston. The latter has preferably a pocket 20 for receiving a tool extremity as will soon appear, while below the piston a leather washer 24 is reinforced by a metal washer 25 to form a reinforced packing therefor. A threaded plug 7 is secured at the bottom to the housing as a closure and has a central limit post 27 for the piston. A gasket 29 serves to make the closure oil tight between the plug and housing, while an interior spring 26 is mounted on the post 27 and bears against the washers and tends to raise the piston to its upper limit, the spring in initial expanded position exerting substantially negligible upward pressure upon the piston, and not being intended to figure materially in the result upon the gauge. A quantity of oil 31 is put into the housing which has a duct 22 through a rib 10 up to the hub 17 where it is connected to the gauge 9. The gauge is of the pressure type whose construction is not novel or part of this invention, but it has the conventional dial 18 and index pointer 19 which may show the pressure delivered to it in pounds. The spring 26 and the post 27 may be omitted without destroying the operation of the device, as the gauge is preferably of the type which tends to automatically return to initial zero position and thus also tends to return the oil to the casing when the pressure is released.

If we consider one operation and use of the device, a block 1 which has a valve 2 has mounted upon its stem a spring 4 the condition of which it may be desirous to determine. The valve stem 3 is provided with the customary washer 5 under the spring by which the spring may be raised. A valve spring compressor of any variety may be used for this purpose, but in the present case a plunger type is shown for clarity, the frame 14 being furnished at the bottom with a washer engaging means at 6. And as it is common for valves to have a centering hole in the head, the bottom of the gaging device may be placed with its point 30 engaging the head in its center, and a plunger 13 of the lifter engaging the pocket 20 of the piston 11 and 21. A set screw 12 serves to grip the plunger so that the device is actually pendent upon the plunger, and for all present purposes may be considered a part thereof. This particular type of valve spring compressor has a link 15 at the forward extremity of the frame 14 and a lever 16 pivoted in the plunger 13 and at its short extremity to the mentioned link. If the handle is manually depressed, the frame will be drawn upward, tending to raise the washer and valve spring. In such a position, the entire power of the spring is overcome by the lifting force of the frame, but the latter is completely pendent upon the plunger. As the plunger is associated with and solely supported by the piston 21, the latter will bear the weight of the spring and will force oil into the gauge 9 through duct 22, upon which the gauge will show the pressure on its dial. When the spring compressor is released, the spring 26 within the housing 8 will force the piston up into normal raised position again, ready for a new test, the oil, of course, returning into the housing to neutral pressure condition.

Figure 6:
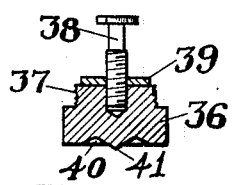
Fig. 6 is a modification of the lower extremity of the device.

In practice, some valves may be so located that it is desirable not only to engage their central holes, but also a portion of the surface of the valve head, and in Fig. 6 there is shown a modification of the form of a plug to be used in connection with the housing 8 instead of the plug 7. The modified form of plug, designated 36, provides a concave face 40 with a central projection 41, with threads 37 adapted to be screwed into the housing 8. The plug 36 also provides an adjustable limiting stop for the piston in the form of a threaded stud 38 which may be set in any adjusted position by means of a lock nut 39.

Figure 7:
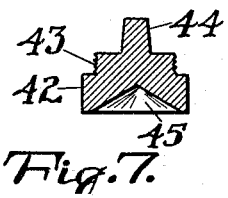
Fig. 7 is a simplified form of the said modification.

Referring to Fig. 7, there is shown a still further modification of the plug for the housing 8 for use in connection with valve heads without any central hole, the plug 42 being provided with a concave seat 45 having the general form of the convex surface of a valve head. The plug 42 provides threads 43 for screwing into the housing 8 and an integral post 44 corresponding in function to the post 27 of the plug 7.

Figure 5:
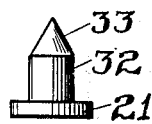
Fig. 5 is a modification of a piston of my device.
Figure 3:
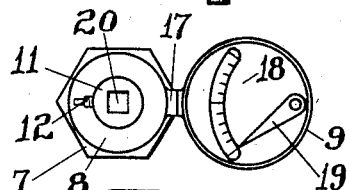
Fig. 3 is a top plan view of the measuring device when dissociated from the spring compressor.
Figure 4:
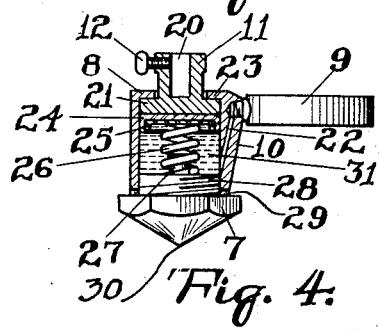
Fig. 4 is a vertical section of the same, the pressure gauge being shown in full, however.

It is obvious that different types of valve lifters, or spring compressors, may be employed in connection with the tester shown in Fig. 4, examples of such other devices being shown in my Patent No. 1,607,667, issued November 3, 1926, and Patent No. 1,296,784, issued March 11, 1919. All such devices have the common feature of a manually operated handle for causing the descent of a movable member relative to a frame, and the present invention contemplates the use of the pressure engaging instrument for measuring the degree of spring compression caused by the movement of such manually operated devices. While in Fig. 4 the piston 21 is shown as being provided with a socket 20 for the reception of the plunger 13, in Fig. 5 there is shown a modification in the form of the plunger, wherein a projection 32 thereof is convexly formed, as at 33, to be engaged by a suitably recessed member of the spring compressor.

Having now fully described my invention, I claim:—

1. A spring tester including the combination with a frame having a portion for engaging a spring, a relatively movable member arranged to approach or recede from said spring engaging portion in order to compress or release said spring, respectively, and a handle for moving said movable member, of means for gaging the pressure applied to said spring upon operation of said handle including a slidable member supported on said movable member and arranged to be retracted or extended therefrom, a liquid pressure gauge, and enclosed means to communicate the movement of said slidable member during extension or retraction to said gauge.

2. A spring testing device including the combination with a spring compressor frame having a portion for engaging a spring, a relatively movable compressor member arranged on the frame to either approach or recede from said portion for compressing or releasing said spring, respectively, and a handle for moving said relatively movable member, of a gaging instrument associated with said movable member so as to operatively form an extension thereof, said gaging instrument including a pair of slidably associated members, one of which is rigidly associated with said movable compressor member and the other of said pair of slidable members being slidably retractable toward the first member, and a pressure gauge for indicating the pressure applied by said handle through said relatively slidable members to said spring when compressing the same, there being means in said gaging instrument to transmit the relative movement of said slidable members to said gauge.

3. A spring tester including a spring compressor having a movable member, a casing having a gauge mounted upon the same and engagement means adapting the casing to be mounted upon a valve, a movable member in said casing, means for intermediately transmitting the movements of said movable members to said gauge to operate the same, including a spring adapted to raise said movable member, and means upon said movable member adapting the same for engagement by said movable member of said spring compressor.

4. A spring compressor including a casing having a gauge thereon and a piston within, a stop post in said casing engageable by said piston, there being a retaining shoulder upon said casing for said piston, a spring enveloping said post and bearing against said piston to raise the same to inactive position, means upon the piston to receive a valve lifter member and means upon said casing to engage a valve.

5. A spring tester including a casing, there being a piston therein projecting from one extremity thereof, a gauge upon the casing communicating with interior thereof, and a closure plug at the other extremity of said casing having a limit thereon for said piston, said plug being provided exteriorly with means for engaging a valve, there being a limit at the first extremity of said casing to limit the outward movement of the piston.

6. A spring tester including a casing open at both extremities, there being a stop shoulder at one extremity, a piston in the casing having a projection extending exteriorly beyond said stop shoulder, a plug detachably secured at the other extremity of said casing and having a stop post extending into the casing, a spring within the casing between said plug and said piston, and a gauge upon the casing connected with the interior of said casing, there being also a continuous fluid in the casing and in said gauge.

7. A spring tester including a casing having a piston projecting a distance out from one extremity of the same, a plug secured to the other casing extremity, a quantity of fluid in the casing, a gauge connected to the interior of the casing, there being a spring between said plug and said piston to separate the two, a convex valve engagement member on said plug and means upon said piston conditioned for engagement by a compression tool.

8. A sight reading spring tester having a pair of relatively movable members adapted to telescope under compression which is simultaneously registered visibly upon said device, means upon one of said members for engaging a valve, and the other member providing a portion for engaging a spring compressor whereby to compress said device at will.

In testimony whereof, I, ERIC E. ESSEN, have signed my name to this specification this second day of March, 1927.

ERIC. E. ESSEN.